US011126694B2

(12) United States Patent
Schirrmann et al.

(10) Patent No.: US 11,126,694 B2
(45) Date of Patent: Sep. 21, 2021

(54) AUTOMATIC CALIBRATION FOR MODELING A FIELD

(71) Applicant: SCHLUMBERGER TECHNOLOGY CORPORATION, Sugar Land, TX (US)

(72) Inventors: Claudio Schirrmann, Aachen (DE); Adrian Kleine, Aachen (DE); Christian Vogt, Aachen (DE)

(73) Assignee: Schlumberger Technology Corporation, Sugar Land, TX (US)

(*) Notice: Subject to any disclaimer, the term of this patent is extended or adjusted under 35 U.S.C. 154(b) by 313 days.

(21) Appl. No.: 16/309,460

(22) PCT Filed: Jun. 13, 2016

(86) PCT No.: PCT/US2016/037147
§ 371 (c)(1),
(2) Date: Dec. 13, 2018

(87) PCT Pub. No.: WO2017/217964
PCT Pub. Date: Dec. 21, 2017

(65) Prior Publication Data
US 2019/0179873 A1 Jun. 13, 2019

(51) Int. Cl.
*G06F 17/18* (2006.01)
*G01V 99/00* (2009.01)
(Continued)

(52) U.S. Cl.
CPC .............. *G06F 17/18* (2013.01); *E21B 43/00* (2013.01); *G01V 99/005* (2013.01); *G06F 30/20* (2020.01); *G06F 2111/10* (2020.01)

(58) Field of Classification Search
CPC ........ G06F 17/18; G06F 17/175; G06F 17/17; G06F 30/20; G06F 30/00; G06F 2111/10;
(Continued)

(56) References Cited

U.S. PATENT DOCUMENTS 6,813,565 B1* 11/2004 Hu ..................... G01V 11/00
702/14
2001/0056339 A1 12/2001 Robinson et al.
(Continued)

FOREIGN PATENT DOCUMENTS

WO 2014/160741 A1 10/2014

OTHER PUBLICATIONS

Lin Y. Hu, "Gradual Deformation and Iterative Calibration of Gaussian-Related Stochastic Models", 2000, International Association for Mathematical Geology, pp. 87-108 (Year: 2000).*
(Continued)

*Primary Examiner* — Mohamed Charioui
(74) *Attorney, Agent, or Firm* — Michael Guthrie

(57) ABSTRACT

Automatic calibration for modeling a field includes performing model calibration iterations based on measurements of the field. Each model iteration includes obtaining, during the field operation, a current measurement of the field, generating likelihood values corresponding to model realizations of the field, where each likelihood value is generated by at least comparing the current measurement of the field to a modeling result of a corresponding model realization, selecting, based on the likelihood values, at least one selected model realization from the model realizations, generating, by at least adjusting a first input value of the at least one selected model realization, an adjusted model realization of the field based on the at least one selected model realization, and adding the adjusted model realization to the model realizations. Automatic calibration for modeling a field further includes generating a calibrated modeling result of the field based on the adjusted model realization.

20 Claims, 7 Drawing Sheets

(51) Int. Cl.
*E21B 43/00* (2006.01)
*G06F 30/20* (2020.01)
*G06F 111/10* (2020.01)

(58) Field of Classification Search
CPC .............. G06F 2111/08; G06F 2111/06; G06F 2111/04; G06F 2111/00; E21B 43/00; E21B 41/00; G01V 99/005
See application file for complete search history.

(56) References Cited

U.S. PATENT DOCUMENTS

| | | | |
|---|---|---|---|
| 2005/0010383 A1* | 1/2005 | Le Ravalec-Dupin | G01V 1/282 703/10 |
| 2005/0172699 A1* | 8/2005 | Hu | G01V 1/282 73/38 |
| 2006/0149520 A1* | 7/2006 | Le Ravalec-Dupin | G01V 11/00 703/10 |
| 2008/0077371 A1* | 3/2008 | Yeten | E21B 43/00 703/10 |
| 2009/0070086 A1 | 3/2009 | Le Ravalec et al. | |
| 2009/0166033 A1 | 7/2009 | Brouwer et al. | |
| 2009/0182541 A1 | 7/2009 | Crick et al. | |
| 2010/0326669 A1 | 12/2010 | Zhu et al. | |
| 2011/0144965 A1 | 6/2011 | Rossi et al. | |
| 2013/0132052 A1 | 5/2013 | Hogg et al. | |
| 2014/0039859 A1* | 2/2014 | Maucec | E21B 43/00 703/10 |

OTHER PUBLICATIONS

Mediero, et al., "Probabilistic calibration of a distributed hydrological model for flood forecasting," Hydrological Sciences Journal, vol. 56, No. 7, Oct. 1, 2011, pp. 1129-1149.
Extended Search Report for the counterpart European patent application 16905630.6 dated Feb. 7, 2020.
Hantschel, et al., "Fundamentals of Basin and Petroleum Systems Modeling," Springer, Apr. 10, 2009.
International Search Report and Written Opinion for the equivalent International patent application PCT/US2016/037147 dated Mar. 13, 2017.
International Preliminary Report on Patentability for the equivalent International patent application PCT/US2016/037147 dated Dec. 27, 2018.

* cited by examiner

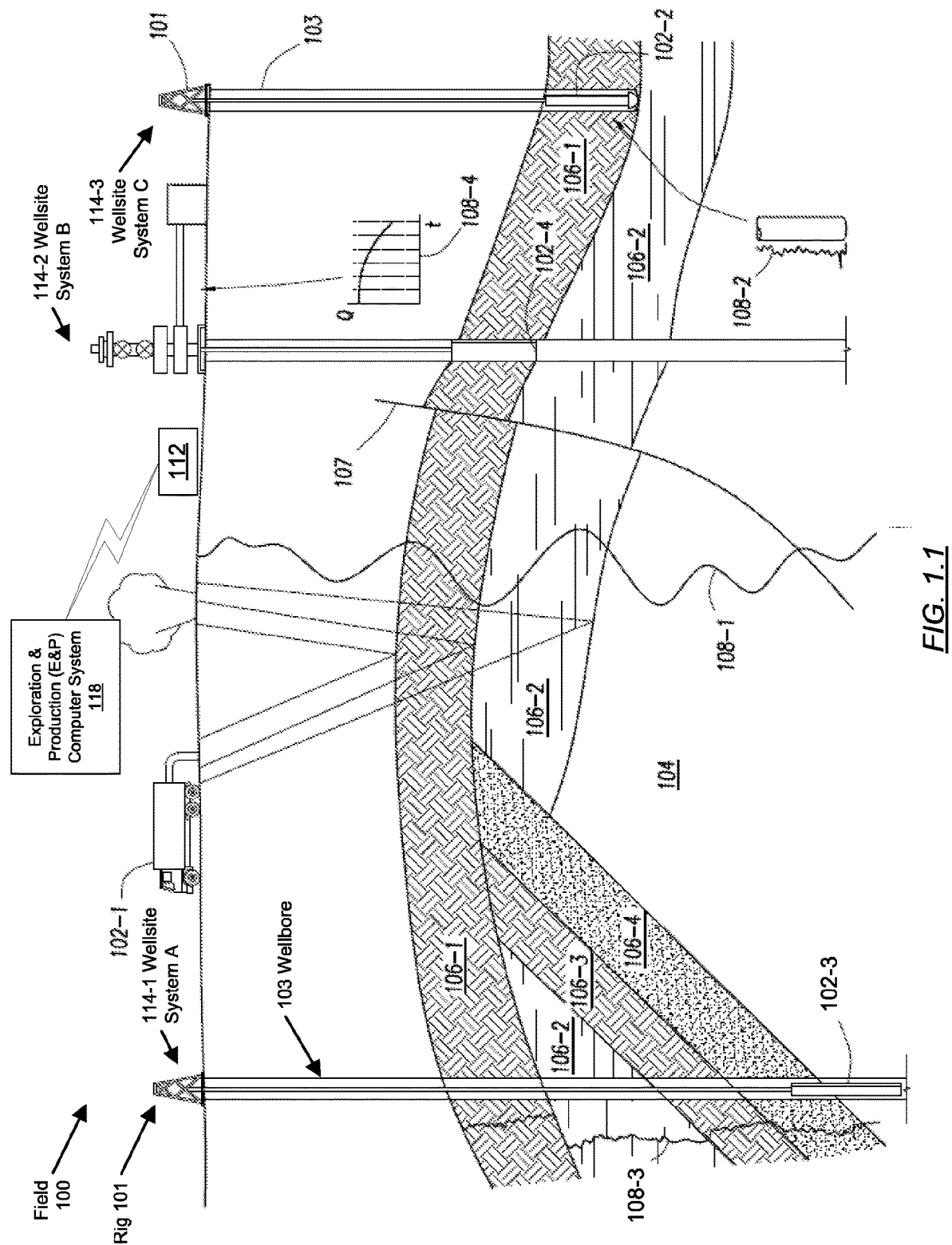
FIG. 1.1

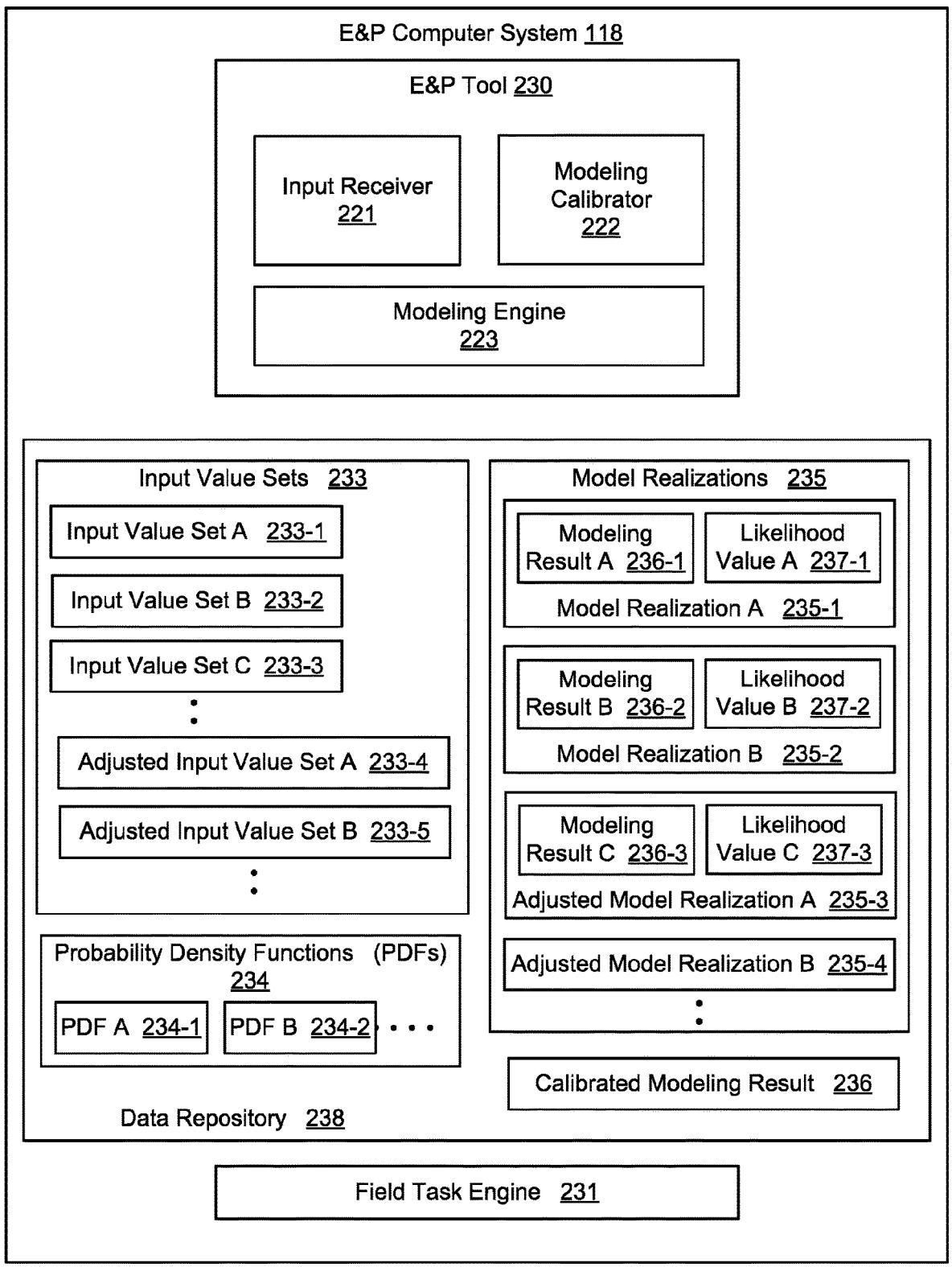
FIG. 1.2

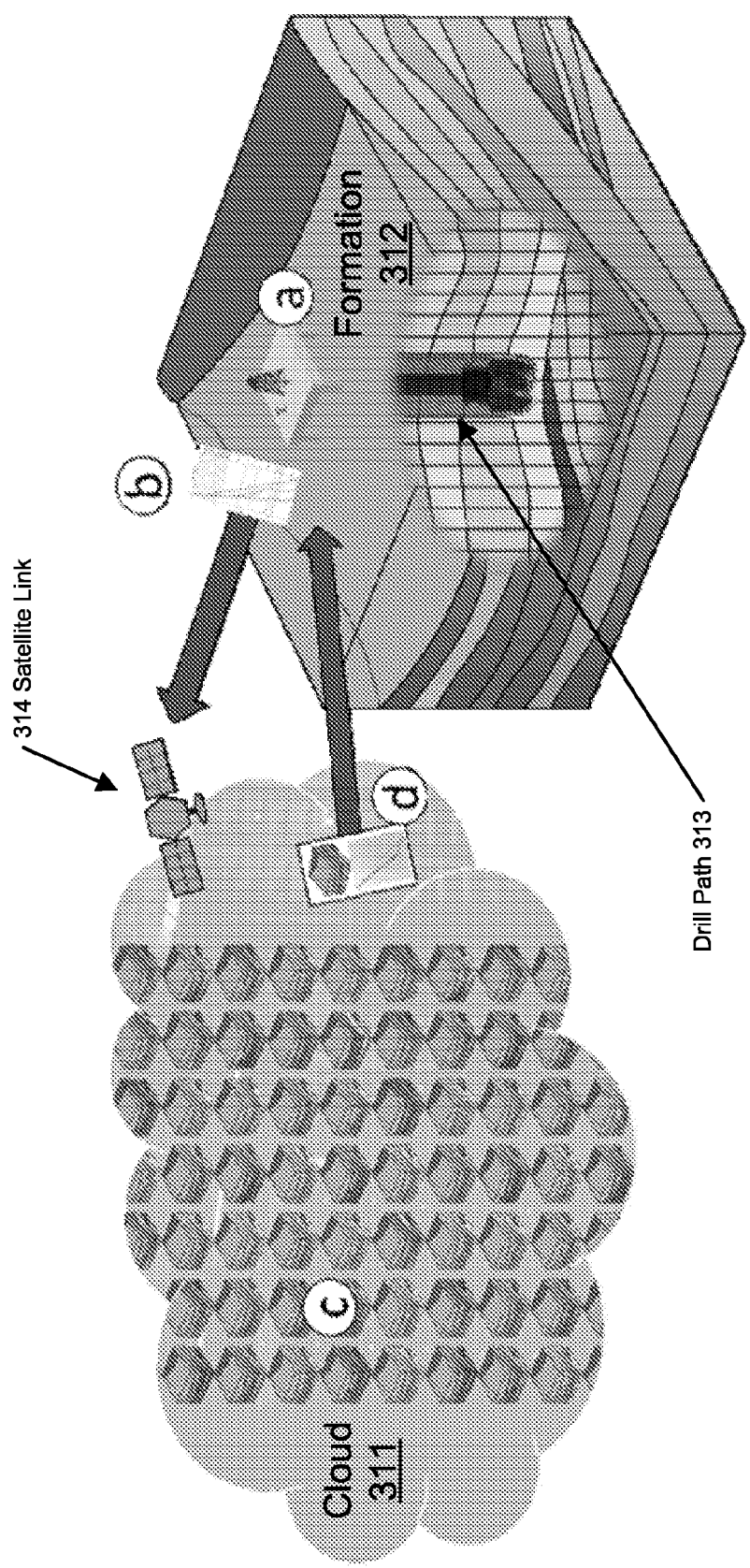
FIG. 3.1

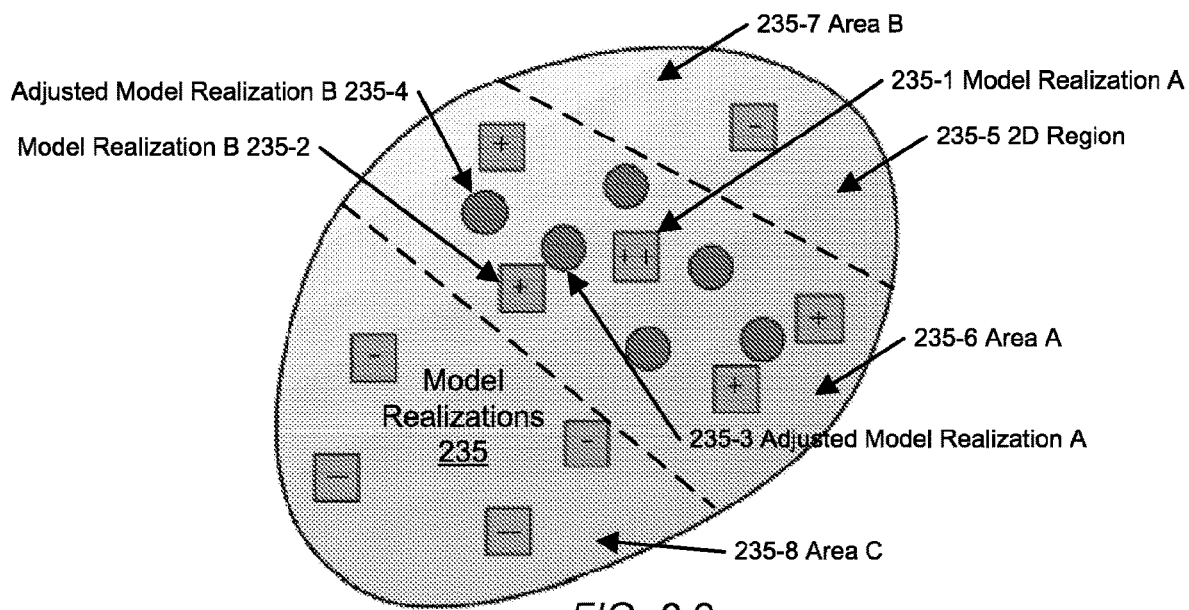
FIG. 3.2
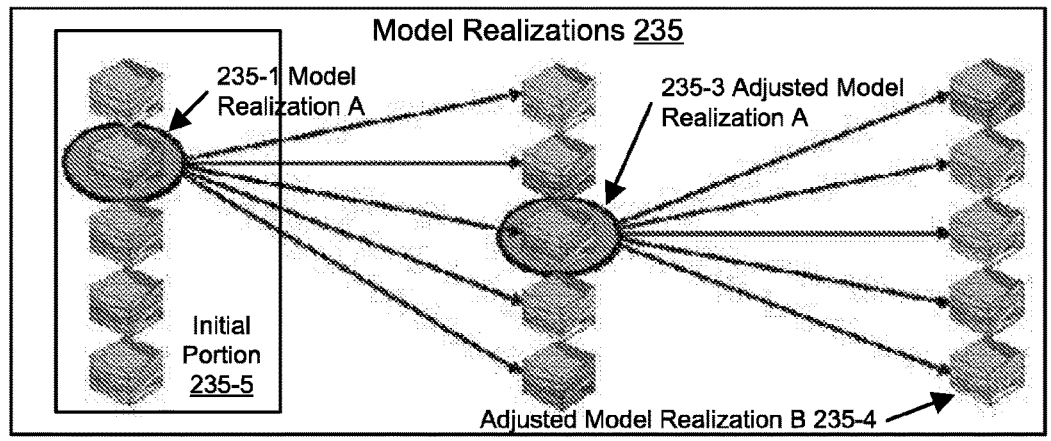
FIG. 3.3
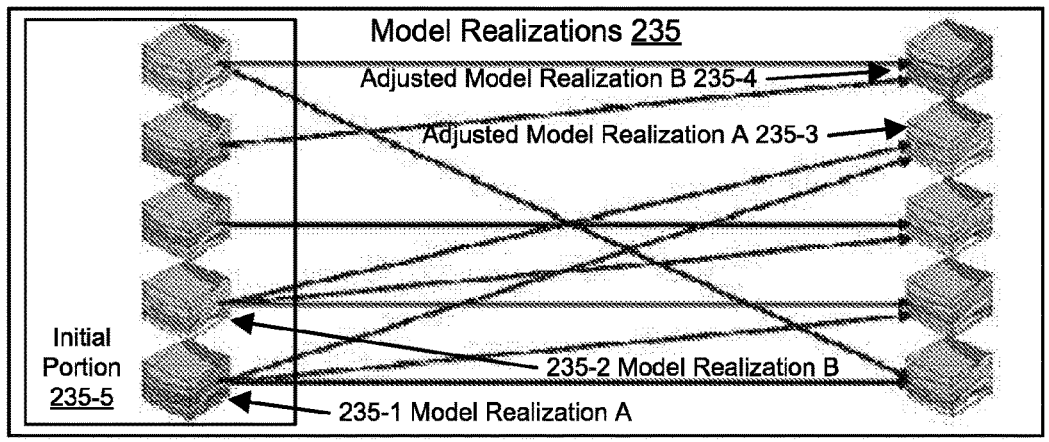
FIG. 3.4

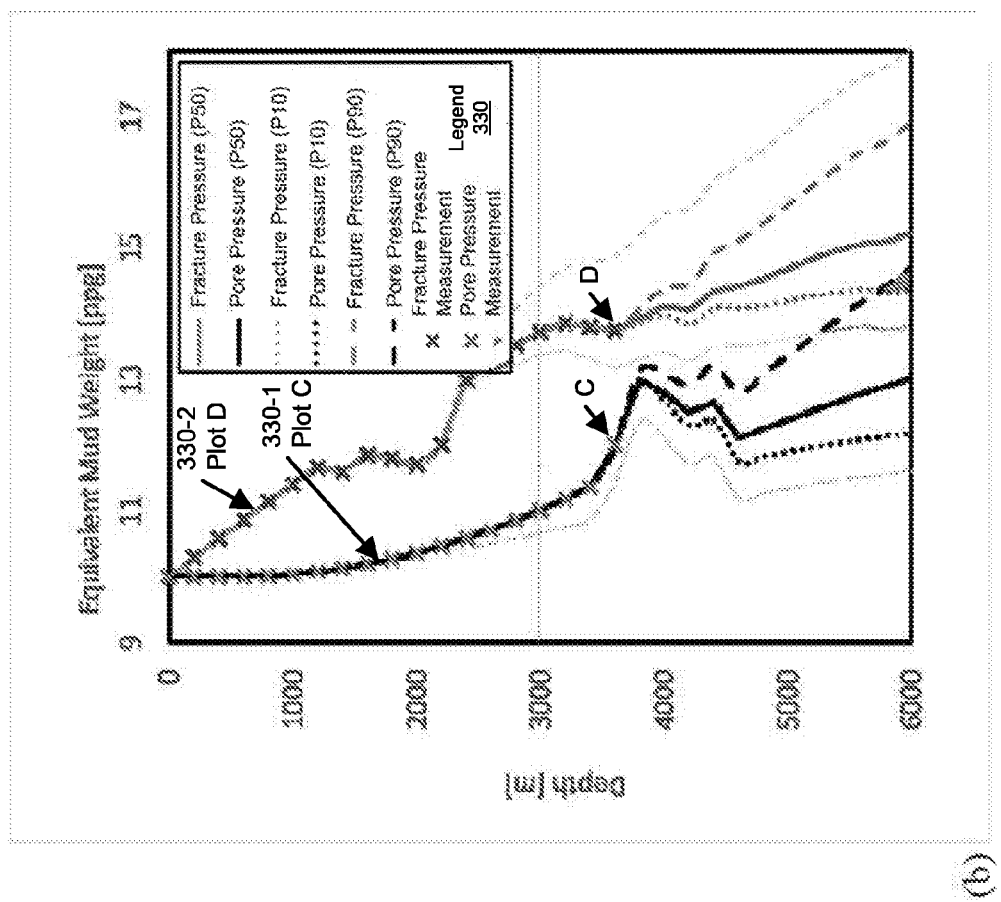
*FIG. 3.6*
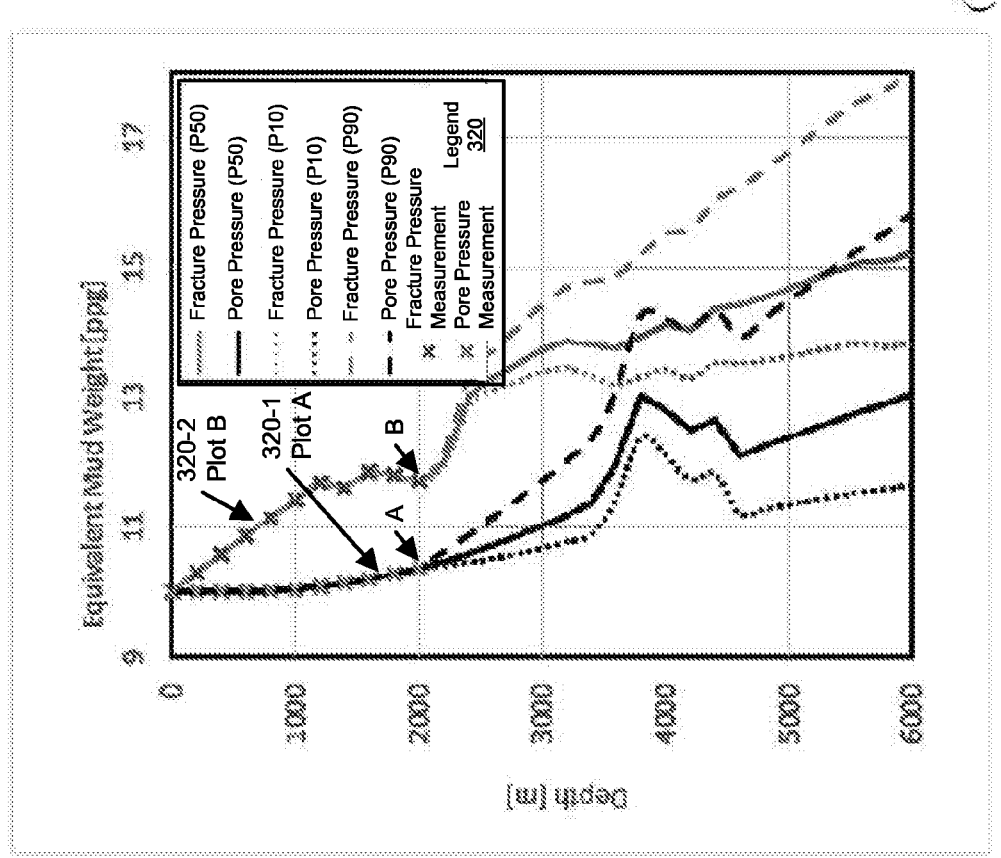
*FIG. 3.5*

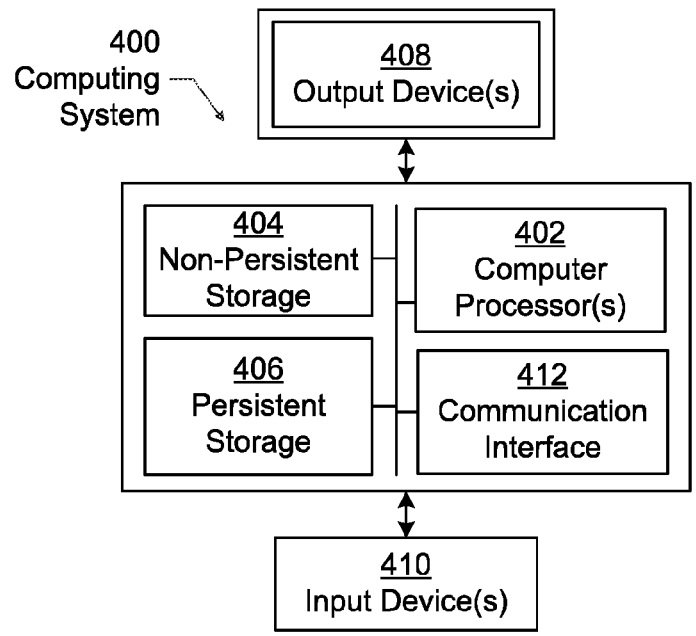
FIG. 4.1
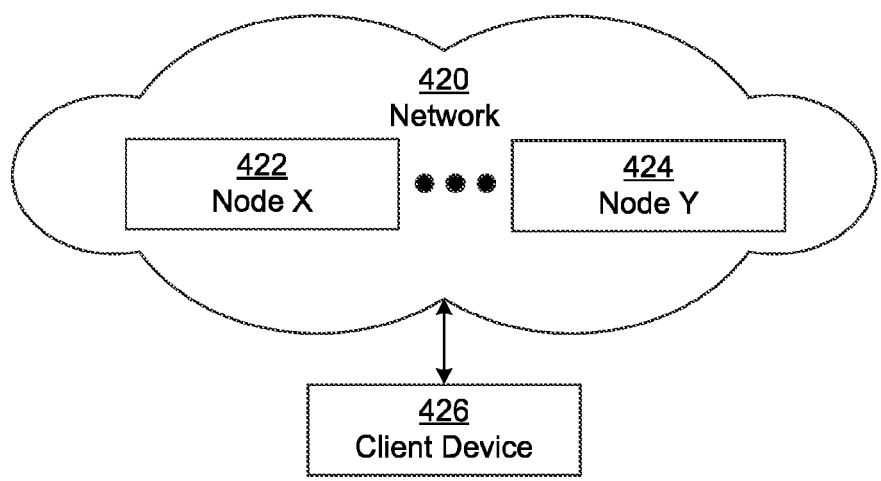
FIG. 4.2

AUTOMATIC CALIBRATION FOR MODELING A FIELD

BACKGROUND

Parameters (e.g., rock permeability, compaction laws, basal heat flows, etc.) used in modeling and simulation of a field are highly uncertain, especially when geological times are considered. The standard procedure is a manual calibration of selected uncertainties to specific measurements. For instance, vitrinite reflectance data may be used to calibrate basal heat flows and thermal conductivities, and porosity and pore pressures may be used to calibrate rock permeability and compaction laws.

SUMMARY

In general, in one aspect, an embodiment of automatic calibration for modeling a field includes a method for performing a field operation of a field. The method includes performing model calibration iterations based on measurements of the field. Each model calibration iteration includes obtaining, during the field operation, a current measurement of the field, generating likelihood values corresponding to model realizations of the field, where each likelihood value is generated by at least comparing the current measurement of the field to a modeling result of a corresponding model realization, selecting, based on the likelihood values, at least one selected model realization from the model realizations, generating, by at least adjusting a first input value of the at least one selected model realization, an adjusted model realization of the field based on the at least one selected model realization, and adding the adjusted model realization to the model realizations. The method further includes generating a calibrated modeling result of the field based on the adjusted model realization from at least one of the model calibration iterations.

Other aspects will be apparent from the following description and the appended claims.

BRIEF DESCRIPTION OF DRAWINGS

The appended drawings illustrate several embodiments of automatic calibration for modeling a field and are not to be considered limiting of its scope, for automatic calibration for modeling a field may admit to other equally effective embodiments.

FIG. 1.1 is a schematic view, partially in cross-section, of a field in which one or more embodiments of automatic calibration for modeling a field may be implemented.

FIG. 1.2 shows a schematic diagram of a system in accordance with one or more embodiments.

FIGS. 3.1, 3.2, 3.3, 3.4, 3.5, and 3.6 show an example in accordance with one or more embodiments.

FIGS. 4.1 and 4.2 show systems in accordance with one or more embodiments.

DETAILED DESCRIPTION

Figure 2:
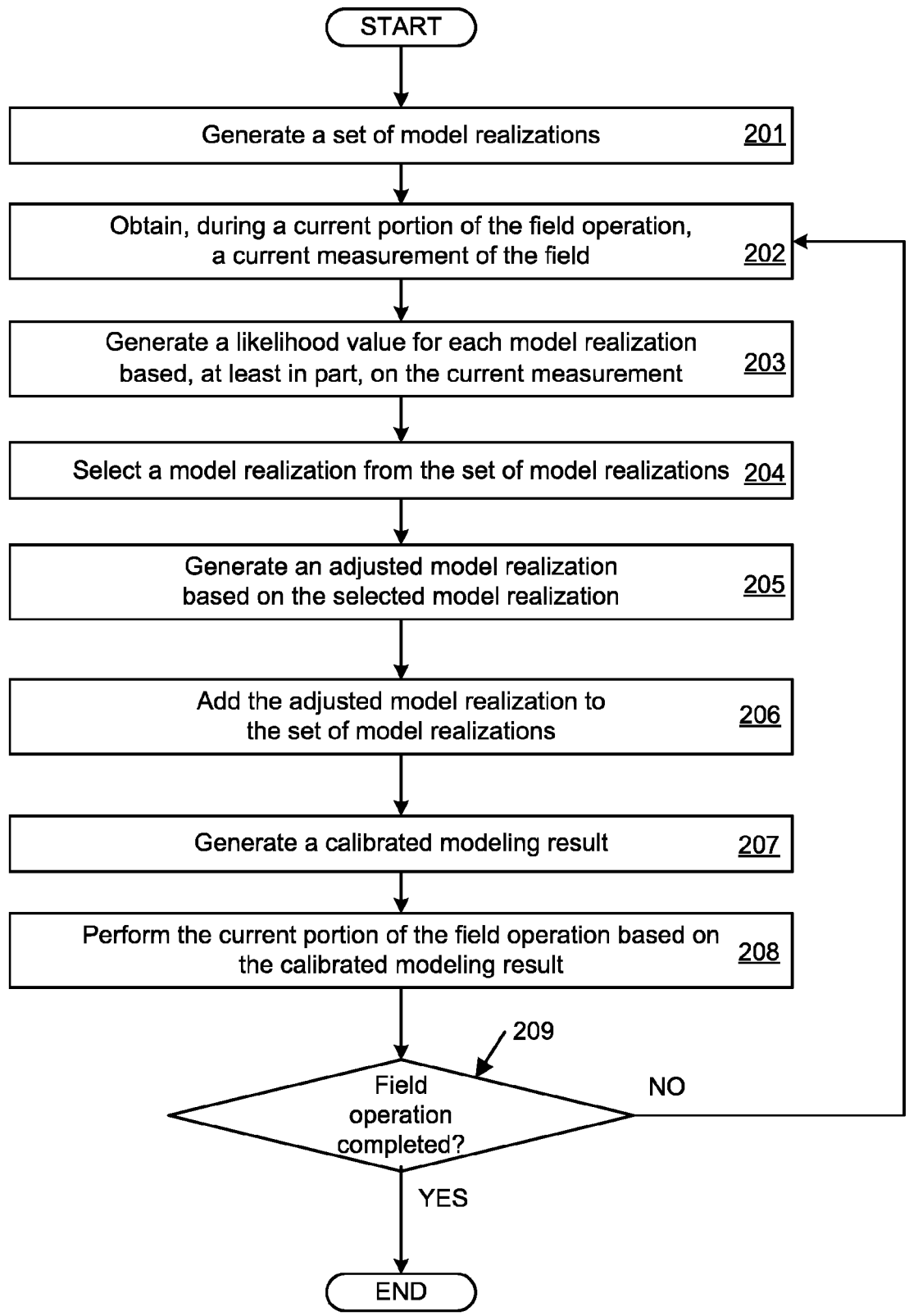
FIG. 2 shows a flowchart in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that one or more embodiments may be practiced without these specific details. In other instances, well-known features have not been described in detail to avoid unnecessarily complicating the description.

In general, embodiments provide a method and system for performing a field operation by at least generating a calibrated modeling result of the field. In one or more embodiments, the calibrated modeling result is generated based on an adjusted model realization from at least one of a number of model calibration iterations. The model calibration iterations are performed based on a number of measurements of the field. In particular, each model calibration iteration includes obtaining, during the field operation, a current measurement of the field. Based on the current measurement, a number of likelihood values corresponding to a number of model realizations are generated. Specifically, each likelihood value is generated by at least comparing the current measurement of the field to a modeling result of a corresponding model realization. Based on the number of likelihood values, at least one model realization is selected from the number of model realizations. By at least adjusting an input value of the at least one selected model realization, an adjusted model realization of the field is generated based on the at least one selected model realization. Accordingly, the adjusted model realization is added to the number of model realizations for the subsequent model calibration iteration.

FIG. 1.1 depicts a schematic view, partially in cross section, of a field (100) in which one or more embodiments of automatic calibration for modeling a field may be implemented. In one or more embodiments, one or more of the modules and elements shown in FIG. 1.1 may be omitted, repeated, and/or substituted. Accordingly, embodiments of automatic calibration for modeling a field should not be considered limited to the specific arrangements of modules shown in FIG. 1.1.

As shown in FIG. 1.1, the field (100) includes the subterranean formation (104), data acquisition tools (102-1), (102-2), (102-3), and (102-4), wellsite system A (114-1), wellsite system B (114-2), wellsite system C (114-3), a surface unit (112), and an exploration and production (E&P) computer system (118). The subterranean formation (104) includes several geological structures, such as a sandstone layer (106-1), a limestone layer (106-2), a shale layer (106-3), a sand layer (106-4), and a fault line (107). In particular, these geological structures form at least one reservoir containing fluids (e.g., hydrocarbon) as described below.

Petroleum (i.e., oil and gas) may be formed within a basin by chemical reactions of sedimentary organic matter material. After generation, petroleum migrates within the basin via permeable pathways until the petroleum accumulates within porous and permeable reservoir rock formations, or the petroleum is dissipated by chemical or biochemical reactions, or leakage to the surface of the basin. Within any particular basin, one or more "plays" for possible production of hydrocarbons may exist. The United States Geological Survey defines a "play" as "a set of discovered or undiscovered oil and gas accumulations or prospects that exhibit nearly identical geological characteristics such as trapping style, type of reservoir and nature of the seal". A reservoir may include several different plays which differ from each other by the nature of the fluids within the pore spaces of the rock formations and/or the pressure thereof. A "reservoir" is a rock formation with substantially uniform rock mineral properties and spatial distribution of permeability such that the rock formation has the capability to store fluids, and has the capability for fluids to be moved therethrough by application of suitable pressure variations.

Modeling is a technique to represent and simulate characteristics, operations, and other behaviors of at least a portion of a field (e.g., the field (100), subterranean formation (104), wellsite system A (114-1), etc.) using mathematical and physical rules. The modeling result may include a value related to the characteristics, operations, and other behaviors of the field (100) that is derived using such mathematical and physical rules. Basin modeling (or basin simulation) is a technique for modeling geological processes that may have occurred in sedimentary basins over geological times. For example, basin modeling may simulate the deposition and erosion of sediments through geologic time, calculating the temperature, pressure and rock stress distribution. Input parameters to the basin modeling include burial history, paleo-water-depth maps, SWITs (sediment water interface temperatures), HF maps, and several rock attributes (e.g., thermal conductivities, permeabilities, rock densities, radiogenic sources). During the basin modeling, temperatures and pressures are determined by solving a differential equation e.g., by using a finite element solver. In one or more embodiments, basin modeling may be used without considering any hydrocarbon fluids or reservoir. In one or more embodiments, overpressure prediction may be performed with basin modeling to reveal basin-wide water flow connectivities, porosity distributions correlating with potential hydrocarbon storage capacity and fracturing, i.e., sealing strengths of potential hydrocarbon storage containers. Further, basin modeling may also be used for evaluation of basin-wide temperature distributions, which is the main controlling parameter determining the velocity of chemical reactions for generation of hydrocarbons within source rocks. Accordingly, the maturity defining the hydrocarbon bearing potential of source rocks may be modeled.

In one or more embodiments, the basin modeling includes petroleum system modeling that simulates the events leading to generation, migration and accumulation of hydrocarbons in reservoir rocks. In such embodiments, inputs to basin modeling include the "charge potential" (e.g., source rock organic carbon content, source rock thickness, and source rock properties), and the trap (e.g., the reservoir geometry, reservoir and seal qualities) of a play. In one or more embodiments, the basin modeling may also include modeling the thermal, pressure and hydrocarbon generation and migration history to make predictions of current hydrocarbon quality and spatial distribution within the basin. In one or more embodiments, the basin modeling may also include a description of petroleum fluids (e.g., pressure, volume, and temperature (PVT), composition, etc.) that is determined, at least in part, by the processes of generation and expulsion that govern the composition of the fluids, and the PVT behavior responsible for the distribution of components in each fluid phase during secondary migration and accumulation in a reservoir. The charge history of an accumulation or an individual reservoir may be tracked in compositional form according to selected compound classes, for example, $CO_2$, $H_2S$, methane, $C_{2-5}$, $C_{6-15}$, $C_{16+}$. Thermodynamic models known as equations of state, e.g., SRK (Soave-Redlich-Kwong) and PR (Peng-Robinson), may be used to make phase property predictions such as gas-oil ratio (GOR), fluid density and/or fluid viscosity. Post-accumulation alteration processes such as biodegradation, water washing, and oil-to-gas cracking may also be simulated. Source rock tracking, the evolution of the composition through time, yields and compositions of the products generated and released may also be modeled.

Returning to the discussion of FIG. 1.1, in one or more embodiments, data acquisition tools (102-1), (102-2), (102-3), and (102-4) are positioned at various locations along the field (100) for collecting data of the subterranean formation (104), referred to as survey operations. In particular, the data acquisition tools are adapted to measure the subterranean formation (104) and detect the characteristics of the geological structures of the subterranean formation (104). For example, data plots (108-1), (108-2), (108-3), and (108-4) are depicted along the field (100) to demonstrate the data generated by the data acquisition tools. Specifically, the static data plot (108-1) is a seismic two-way response time. Static data plot (108-2) is core sample data measured from a core sample of the subterranean formation (104). Static data plot (108-3) is a logging trace, referred to as a well log. Production decline curve or graph (108-4) is a dynamic data plot of the fluid flow rate over time. Other data may also be collected, such as historical data, analyst user inputs, economic information, and/or other measurement data and other parameters of interest.

Further as shown in FIG. 1.1, each of the wellsite system A (114-1), wellsite system B (114-2), and wellsite system C (114-3) is associated with a rig, a wellbore, and other wellsite equipment configured to perform wellbore operations, such as logging, drilling, fracturing, production, or other applicable operations. For example, the wellsite system A (114-1) is associated with a rig (101), a wellbore (103), and drilling equipment to perform drilling operation. Similarly, the wellsite system B (114-2) and wellsite system C (114-3) are associated with respective rigs, wellbores, other wellsite equipments, such as production equipment and logging equipment to perform production operations and logging operations, respectively. Generally, survey operations and wellbore operations are referred to as field operations of the field (100). In addition, data acquisition tools and wellsite equipments are referred to as field operation equipments. The field operations are performed as directed by a surface unit (112). For example, the field operation equipment may be controlled by a field operation control signal that is sent from the surface unit (112).

In one or more embodiments, the surface unit (112) is operatively coupled to the data acquisition tools (102-1), (102-2), (102-3), (102-4), and/or the wellsite systems. In particular, the surface unit (112) is configured to send commands to the data acquisition tools (102-1), (102-2), (102-3), (102-4), and/or the wellsite systems and to receive data therefrom. In one or more embodiments, the surface unit (112) may be located at the wellsite system A (114-1), wellsite system B (114-2), wellsite system C (114-3), and/or remote locations. The surface unit (112) may be provided with computer facilities (e.g., an E&P computer system (118)) for receiving, storing, processing, and/or analyzing data from the data acquisition tools (102-1), (102-2), (102-3), (102-4), the wellsite system A (114-1), wellsite system B (114-2), wellsite system C (114-3), and/or other parts of the field (100). The surface unit (112) may also be provided with or have functionally for actuating mechanisms at the field (100). The surface unit (112) may then send command signals to the field (100) in response to data received, stored, processed, and/or analyzed, for example to control and/or optimize various field operations described above.

In one or more embodiments, the surface unit (112) is communicatively coupled to the E&P computer system (118). In one or more embodiments, the data received by the surface unit (112) may be sent to the E&P computer system (118) for further analysis. Generally, the E&P computer system (118) is configured to analyze, model, control, optimize, or perform management tasks of the aforementioned field operations based on the data provided from the surface unit (112). In one or more embodiments, the E&P computer system (118) is provided with functionality for manipulating and analyzing the data, such as performing simulation, planning, and optimization of production operations of the wellsite system A (114-1), wellsite system B (114-2), and/or wellsite system C (114-3). In one or more embodiments, the result generated by the E&P computer system (118) may be displayed for an analyst user to view the result in a two dimensional (2D) display, three dimensional (3D) display, or other suitable displays. Although the surface unit (112) is shown as separate from the E&P computer system (118) in FIG. 1.1, in other examples, the surface unit (112) and the E&P computer system (118) may also be combined.

Although FIG. 1.1 shows a field (100) on the land, the field (100) may be an offshore field. In such a scenario, the subterranean formation may be in the sea floor. Further, field data may be gathered from the field (100) that is an offshore field using a variety of offshore techniques for gathering field data.

FIG. 1.2 shows more details of the E&P computer system (118) in which one or more embodiments of automatic calibration for modeling a field may be implemented. In one or more embodiments, one or more of the modules and elements shown in FIG. 1.2 may be omitted, repeated, and/or substituted. Accordingly, embodiments of automatic calibration for modeling a field should not be considered limited to the specific arrangements of modules shown in FIG. 1.2.

As shown in FIG. 1.2, the E&P computer system (118) includes an E&P tool (230), a data repository (238) for storing input data, intermediate data, and resultant outputs of the E&P tool (230), and a field task engine (231) for performing various tasks of the field operation. In one or more embodiments, the data repository (238) may include one or more disk drive storage devices, one or more semiconductor storage devices, other suitable computer data storage devices, or combinations thereof. In one or more embodiments, content stored in the data repository (238) may be stored as a data file, a linked list, a data sequence, a database, a graphical representation, any other suitable data structure, or combinations thereof.

In one or more embodiments, the content stored in the data repository (238) includes the input value sets (233), probability density functions (PDFs) (234), model realizations (235), and calibrated modeling result (236). In one or more embodiments, each of the input value sets (233) includes a set of input values corresponding to input parameters for modeling the field (100). In one or more embodiments, the input parameters include one or more of a boundary condition (e.g., pressure, temperature, saturation, etc.), rock parameter (e.g., porosity, permeability, maturity, thermal conductivity, etc.), pore fluid data (e.g., fluid density, fluid kinetics, etc.), layer and fault geometry (e.g., layer thickness, etc.), and fault parameter (e.g., capillary pressure, etc.) associated with the field (100). In one or more embodiments, the input values are assigned in an input value set based on a user input and/or field measurements to model the field (100). For example, at least a portion of the assigned values are based on measurements obtained from the data acquisition tools depicted in FIG. 1.1 above.

In one or more embodiments, multiple sets of input values (e.g., input value set A (233-1), input value set B (233-2), input value set C (233-3), etc.) are used to generate multiple model realizations (e.g., model realizations (235)) of the field (100). A model realization is a model of the field. In other words, the model realization is an estimate of the attributes of the field. Multiple model realizations may exist, whereby each model realization is a different estimate. In one or more embodiments, at least a portion of the input parameters may be assigned different values among the multiple sets of input values (e.g., input value set A (233-1), input value set B (233-2), input value set C (233-3), etc.) to generate different model realizations. For example, the model realization A (235-1) and model realization B (235-2) may be generated based on the input value set A (233-1) and input value set B (233-2), respectively, that have different assigned values for at least one input parameter.

In one or more embodiments, some of the input value sets (233) may be automatically adjusted during modeling of the field (100) to generate adjusted input value sets. For example, the input value set A (233-1) may be automatically adjusted to generate the adjusted input value set A (233-4). Similarly, the input value set B (233-2) may be automatically adjusted to generate the adjusted input value set B (233-5).

In one or more embodiments, each input parameter of the input value sets (233) is assigned one of the PDFs (234). A PDF is a mathematical function that describes a probability for a variable to have any given value within a set of values. For example, the PDF A (234-1) may represent a probability for a particular input parameter associated with the input value sets (233) to have a value, such as in the corresponding values assigned throughout the input value set A (233-1), input value set B (233-2), input value set C (233-3), adjusted input value set A (233-4), adjusted input value set B (233-5), etc. In one or more embodiments, the probability is based on a level of uncertainty of the assigned value, for example as a result of equipment resolution and/or error limitation of the data acquisition tools depicted in FIG. 1.1 above. In another example, the PDF B (234-2) may represent a probability for another input parameter associated with the input value sets (233) to take on various values assigned throughout the input value set A (233-1), input value set B (233-2), input value set C (233-3), adjusted input value set A (233-4), adjusted input value set B (233-5), etc.

A model realization (e.g., model realization A (235-1), model realization B (235-2), adjusted model realization A (235-3), adjusted model realization B (235-4), etc.) includes a three-dimensional (3D) volume (not shown) that represents a portion of the field (100). For example, the 3D volume may represent a portion of the subterranean formation (104) depicted in FIG. 1.1 above. In one or more embodiments, the 3D volume is associated with a grid having a large number (e.g., thousands, hundreds of thousand, millions, etc.) of grid points corresponding to locations in the subterranean formation (104). In one or more embodiments, each model realization (e.g., model realization A (235-1), model realization B (235-2), adjusted model realization A (235-3), adjusted model realization B (235-4), etc.) further includes information assigned to each grid point that describes characteristics, operations, or other behaviors of a corresponding location in the field (100). The information assigned to the grid points may include the input values (referred to as the modeling input data) in an input value set and/or a modeling result (referred to as the modeling output data) derived from the input value set. In particular, the modeling output data is an output of the modeling engine (223) described below. For example, the modeling result A (236-1) of the model realization A (235-1) may include derived porosity or pore pressure values that are assigned to the grid points and are derived based on the input data set A (233-1). Similarly, the modeling result B (236-2) of the model realization B (235-2) may include derived porosity or pore pressure values that are assigned to the grid points and are derived based on the input data set B (233-2). In addition, the modeling result C (236-3) of the adjusted model realization A (235-3) may include derived porosity or pore pressure values that are assigned to the grid points and are derived based on the adjusted input value set A (233-4).

In one or more embodiments, each model realization (e.g., model realization A (235-1), model realization B (235-2), adjusted model realization A (235-3), adjusted model realization B (235-4), etc.) also includes a likelihood value representing the likelihood of the modeling results (e.g., derived porosity or pore pressure values) matching actual measurements (e.g., measured porosity or pore pressure values). For example, the likelihood value A (237-1), likelihood value B (237-2), and likelihood value C (237-3) may represent the likelihood of the modeling result A (236-1), modeling result B (236-2), and modeling result C (236-3), respectively, matching actual measurements. In one or more embodiments, the likelihood values are statistical measures and are updated iteratively based on new measurements obtained over time or obtained from additional locations. Calibration is a technique to adjust the likelihood values of the model realizations (235) (e.g., model realization A (235-1), model realization B (235-2), adjusted model realization A (235-3), adjusted model realization B (235-4), etc.) to improve how accurate the likelihood values are in representing the matching between the modeling results and the actual measurements. In one or more embodiments, multiple iterations of the calibration are performed during the field operation to continuously improve the likelihood values of the model realizations (235).

In one or more embodiments, the model realization A (235-1) and model realization B (235-2) are part of an initial portion of the model realizations (235) that is generated prior to performing any calibration of the model realizations (235). In particular, the modeling result A (236-1), modeling result B (236-2), and any other modeling results of the initial portion of the model realizations (235) are generated once without being regenerated in their entirety during subsequent calibrations of the model realizations (235). In this context, the modeling result A (236-1), modeling result B (236-2), and any other modeling results of the initial portion are collectively referred to as the initial modeling results. Similarly, the portion of the input value sets (233) (e.g., input value set A (233-1), input value set B (233-2), etc.) used to generate the initial portion of the model realizations (235) is referred to as the initial portion of the input value sets (233). During the calibration, one or more of the model realization A (235-1), model realization B (235-2), and/or other model realizations in the initial portion may be adjusted in an attempt to increase the likelihood value of the resultant model realization, such as the adjusted model realization A (235-3). In this context, the initial portion of the model realizations (235) is referred to as an initial set of model realizations while the model realizations (235) is referred to as an expanded set of model realizations.

In one or more embodiments, the actual measurements (e.g., measured porosity or pore pressure values) may be obtained using the data acquisition tools (as depicted in FIG. 1.1 above) at different time points or from different locations of the field (100). Accordingly, the likelihood value A (237-1) and likelihood value B (237-2) may be dependent on when and where the actual measurements are performed. For example, when a new pore pressure measurement is performed at a new depth as the drilling operation progresses, the likelihood value A (237-1) and likelihood value B (237-2) may be updated based on the comparison between the new pore pressure measurement and the modeling result A (236-1) and modeling result B (236-2), respectively. Based on the update, the accuracies of the likelihood value A (237-1) and likelihood value B (237-2) are improved in representing the matching between the initial modeling results and the actual measurements. For example, one or both of the likelihood value A (237-1) and likelihood value B (237-2) may be increased or decreased as an improvement in accuracy.

In one or more embodiments, one or more of the model realizations (235) may be adjusted during the calibration. For example, based on the likelihood value A (237-1) meeting a pre-determined criterion, the model realization A (235-1) may be selected during a calibration iteration for adjustment to generate the adjusted model realization A (235-3). As noted above, the adjusted model realization A (235-3) is generated based on the adjusted input value set A (233-4), which is adjusted from the input value set A (233-1) initially used to generate the model realization A (235-1) prior to the calibration. In one or more embodiments, the adjusted input value set A (233-4) may be further adjusted in a subsequent calibration iteration to generate a further adjusted input value set, such as the adjusted input value set B (233-5).

In one or more embodiments, the calibrated modeling result (236) is a modeling result based on at least one iteration of the calibration. In other words, the calibrated modeling result (236) is based on a combination of the initial portion of the model realizations (235) and at least on adjusted model realization (e.g., adjusted model realization A (235-3)).

In one or more embodiments, the E&P tool (230) includes the input receiver (221), the modeling calibrator (222), and the modeling engine (223). Each of these components of the E&P tool (230) is described below.

In one or more embodiments, the input receiver (221) is configured to obtain the input value sets (233) and the PDFs (234) for analysis by the modeling calibrator (222) and the modeling engine (223). In one or more embodiments, the input receiver (221) obtains at least a portion of the input value sets (233) and the PDFs (234) from a user. In other words, the portion of the input value sets (233) and the PDFs (234) is specified by the user. In one or more embodiments, the input receiver (221) obtains the input value sets (233) and the PDFs (234), at least in part, from the surface unit (112) depicted in FIG. 1.1 above. For example, the input receiver (221) may obtain one or more portions of the input value sets (233) and the PDFs (234) from the surface unit (112) intermittently, periodically, in response to a user activation, or as triggered by an event. Accordingly, the intermediate and final results of the modeling calibrator (222) and the modeling engine (223) may be generated intermittently, periodically, in response to a user activation, or as triggered by an event.

In one or more embodiments, the modeling calibrator (222) is configured to perform iterations of the calibration for the model realizations (235). During each iteration, the modeling calibrator (222) generates and/or updates the likelihood values (e.g., likelihood value A (237-1), etc.) of the model realizations (235). In one or more embodiments, the modeling calibrator (222) generates and/or updates the likelihood values by, at least in part, comparing the modeling results of the model realizations (235) to current measurements obtained during each calibration iteration. In other words, the modeling calibrator (222) iteratively improves the accuracies of the likelihood values based on a sequence of new measurements obtained as the field operation progresses. For example, a sequence of new well measurements may be obtained from the bottom hole assembly in the ever increasing well trajectory made accessible by the progression of the drilling operation.

Further, the modeling calibrator (222) updates the model realizations (235) during each iteration. In one or more embodiments, the modeling calibrator (222) updates the model realizations (235) by selecting at least one model realization based on the generated/updated likelihood values. For example, a model realization (e.g., model realization A (235-1)) with high likelihood value (e.g., the likelihood value A (237-1) exceeding a pre-determined threshold) may be selected. An adjusted model realization (e.g., adjusted model realization A (235-3)) is then generated based on the selected model realization(s) (e.g., model realization A (235-1)). Accordingly, the model realizations (235) is updated by adding the adjusted model realization (e.g., model realization A (235-1)). In one or more embodiments, the modeling calibrator (222) may also remove a model realization (e.g., model realization B (235-2)) with low likelihood value (e.g., the likelihood value B (237-2) below a pre-determined threshold) to update the model realizations (235).

In addition, the modeling calibrator (222) is configured to generate the calibrated modeling result (236) based on, at least in part, the model realization (235-3) as adjusted during at least one of the model calibration iterations. In one or more embodiments, the modeling calibrator (222) performs the calibration iterations and generates the calibrated modeling result (236) using the method described in reference to FIG. 2 below. An example of generating/updating the model realizations (235) during the calibration iterations is described in reference to FIG. 3.2 below.

In one or more embodiments, the modeling engine (223) is configured to perform modeling of the field (100). In one or more embodiments, the modeling includes the aforementioned basin modeling and/or the petroleum system modeling. In one or more embodiments, the modeling further includes reservoir modeling, such as performing simulation, planning, and optimization of exploratory and/or production operations of the wellsite system A (114-1), wellsite system B (114-2), and/or wellsite system C (114-3) depicted in FIG. 1.1 above. In one or more embodiments, the modeling engine (223) generates the model realizations (235) based on the input value sets (233) according to the aforementioned mathematical and physical laws. In one or more embodiments, the modeling engine (223) generates the model realizations (235) using a simulator that performs mathematical computations based on the physical laws. The final results of the mathematical computations form the output of the simulator and included as modeling output data in a model realization. In one or more embodiments, the modeling engine (223) generates the model realizations (235) using the method described in reference to FIG. 2 below.

In one or more embodiments, the result generated by the E&P computer system (118) may be displayed to a user using a two dimensional (2D) display, three dimensional (3D) display, or other suitable displays. For example, the calibrated modeling result (236) may be used by the user to predict hydrocarbon content throughout portions of the field (100) and to facilitate drilling, fracturing, or other exploratory and/or production operations of the field (100).

In one or more embodiments, the E&P computer system (118) includes the field task engine (231) that is configured to generate a field operation control signal based at least on a result generated by the E&P tool (230), such as based on the adjusted model realization A (235-3) and/or the calibrated modeling result (236). As noted above, the field operation equipment depicted in FIG. 1.1 above may be controlled by the field operation control signal. For example, the field operation control signal may be used to control drilling equipment, an actuator, a fluid valve, or other electrical and/or mechanical devices disposed about the field (100) depicted in FIG. 1.1 above.

The E&P computer system (118) may include one or more system computers, such as shown in FIGS. 4.1 and 4.2 below, which may be implemented as a server or any conventional computing system. However, those skilled in the art, having benefit of this disclosure, will appreciate that implementations of various technologies described herein may be practiced in other computer system configurations, including hypertext transfer protocol (HTTP) servers, handheld devices, multiprocessor systems, microprocessor-based or programmable consumer electronics, network personal computers, minicomputers, mainframe computers, and the like.

While specific components are depicted and/or described for use in the units and/or modules of the E&P computer system (118) and the E&P tool (230), a variety of components with various functions may be used to provide the formatting, processing, utility and coordination functions for the E&P computer system (118) and the E&P tool (230). The components may have combined functionalities and may be implemented as software, hardware, firmware, or combinations thereof.

FIG. 2 depicts an example method in accordance with one or more embodiments. For example, the method depicted in FIG. 2 may be practiced using the E&P computer system (118) described in reference to FIGS. 1.1 and 1.2 above. In one or more embodiments, one or more of the elements shown in FIG. 2 may be omitted, repeated, and/or performed in a different order. Accordingly, embodiments of automatic calibration for modeling a field should not be considered limited to the specific arrangements of elements shown in FIG. 2.

Initially in Block 201, the initial portion of a set of model realizations is generated. In one or more embodiments, the set of model realizations is iteratively updated during calibration iterations. Prior to any calibration iteration, the initial portion of the set of model realizations is generated based on an initial portion of input value sets. In one or more embodiments, a Monte Carlo risking algorithm is used to generate the initial portion of the set of model realizations using randomly selected input values specified in the initial portion of input value sets.

In Block 202, a current measurement of the field is obtained during a current portion of the field operation. For example, the current portion of the field operation may correspond to a particular depth being drilled during a drilling operation. Accordingly, the new measurement is obtained from the particular depth just becoming accessible to the data acquisition tools. In one or more embodiments, the current measure may include a well pressure, temperature log, porosity data, vitrinite reflectance, layer thickness, thermal conductivity data, geochemical data, permeability data, etc. obtained by using logging techniques such as logging-while-drilling (LWD), measuring-while-drilling (MWD), or other suitable logging techniques.

In Block 203, a likelihood value is generated for each model realization in the set of model realizations. In one or more embodiments, the likelihood value is generated by at least comparing the current measurement to a modeling result of the corresponding model realization. Specifically, a statistical value of error is generated as the result of the comparison to represent the difference between the current measurement and the modeling result across grid points of the model realization. For example, the statistical value of error may be a root-mean-squared average, an arithmetic mean, a geometric mean, a median value, or any other type of statistical average of the comparison differences from the grid points. An example statistical value of error based on the root-mean-squared average is shown in Eq (1) below where $d_j^{sim}$ represents a simulated parameter value for $j^{th}$ grid point, $d_j^{obs}$ represents a measured parameter value for $j^{th}$ grid point, and n represents the number of grid points in the model realization.

$$RMSE = \sqrt{\frac{1}{n}\sum_{j=1}^{n}(d_j^{sim} - d_j^{obs})^2} \qquad \text{Eq(1)}$$

In one or more embodiments, the likelihood value includes a component that is inversely proportional to the statistical value of error. For example, the likelihood value may include the inverse of the statistical value of error or other inversely proportional function of the statistical value of error. An example likelihood value based on the root-mean-squared average shown in Eq (1) above is 1/RMSE.

In one or more embodiments, the likelihood value includes an additional component that is dependent on a set of probability functions (PDFs) where each PDF represents a level of uncertainty of a corresponding input parameter. For example, the additional component of the likelihood value adjusts the likelihood value by multiplying using an adjustment factor or by adding an additional adjustment term. In one or more embodiments, the adjustment factor or the additional adjustment term is proportional to a product of PDFs of input parameter values included in the input value set that is used to generate the model realization.

In one or more embodiments, the PDFs is further adjusted based on the likelihood values to be used in the subsequent calibration iteration. For example, the probability of the input values associated with high likelihood model realization may be adjusted higher. In one or more embodiments, the adjusted PDFs are posteriori PDFs.

In Block 204, at least one model realization is selected from the set of model realizations based on the likelihood values. In one or more embodiments, the model realization with the highest likelihood value among the set of model realizations is selected. In one or more embodiments, each model realization having a likelihood value exceeding a pre-determined threshold is selected. In one or more embodiments, a portion of the set of modeling realizations is selected using a statistical sampling technique, such as using a genetic algorithm, a Markov Chain Monte Carlo algorithm, a Metropolis Sampling algorithm, a Kalman Filtering algorithm, etc.

A genetic algorithm is a search heuristic that mimics the process of natural selection. In the genetic algorithm, a population of candidate solutions (referred to as individuals) is iteratively evolved toward better solutions where the individuals in each iteration form a generation. Each individual has a set of alterable genotype properties (i.e., genome) that may be mutated between generations. In each generation, an objective function representing the fitness of the individual is evaluated to stochastically select more fit individuals. The selected individual's genome is modified (e.g., recombined or randomly mutated) to form a new generation. In one or more embodiments, each model realization with the associated likelihood value and the input value set are treated as the individual with associated fitness and genome to apply the genetic algorithm. In other words, the likelihood value corresponds to the fitness, the input value set corresponds to the genome, and selecting the model realization corresponds to selecting the more fit individuals.

The Metropolis-Hastings algorithm is a Markov chain Monte Carlo method for obtaining a sequence of random samples from a probability distribution. In one or more embodiments, the likelihood values of the set of model realizations are treated as the probability distribution to apply the Metropolis-Hastings algorithm. Specifically, selecting the model realization corresponds to selecting the sequence of random samples in the Metropolis-Hastings algorithm.

In Block 205, an adjusted model realization is generated by adjusting one or more selected model realizations. In one or more embodiments, the adjusted model realization is generated by adjusting an input value set of the one or more selected model realizations. For example, the input value set may be adjusted by applying a linear combination of multiple input value sets of the selected model realizations, applying random adjustments (e.g., noises) to input values in an input value set, applying a genetic algorithm, applying a linear quadratic estimation (e.g., a steady-state Kalman filter with a single filter step and a damping factor of one or greater), etc.

In one or more embodiments, the input value set is adjusted by randomly adjusting one or more input values, which corresponds to mutating the individual's genome in the genetic algorithm. Accordingly, the adjusted model realization is generated by simulating the field using the adjusted input value set as inputs to the modeling engine.

In one or more embodiments, the adjusted model realization is generated by randomly combining two or more input value sets of the selected model realizations, which corresponds to recombining two individual's genomes in the genetic algorithm. In one or more embodiments, input parameters' values from two input value sets are intermixed to generate an adjusted input value set that is used to generate the adjusted model realization. For example, one input parameter's value from an input value set may be combined with a different input parameter's value from another input value set to generate the adjusted input value set. Accordingly, the adjusted model realization is generated by simulating the field using the adjusted input value set as inputs to the modeling engine. Specifically, simulating the field using the adjusted input value set updates the modeling output data in the selected model realizations to generate the adjusted modeling realization. In other words, the adjusted modeling realization includes updated modeling output data derived from the adjusted input value set.

In Block 206, the adjusted model realization is added to the set of model realizations to be used in the subsequent calibration iteration. In one or more embodiments, the non-selected model realizations remain in the set of model realizations.

In Block 207, a calibrated modeling result is generated based on the adjusted model realization. In one or more embodiments, the model realization having the highest likelihood value in the expanded set of modeling realizations is used to generate the calibrated modeling result. In one or more embodiments, the modeling results from at least a portion of the expanded set of modeling realizations are aggregated to generate the calibrated modeling result. For example, the modeling results (denoted as $X_i$) are multiplied by respective likelihood values (denoted as $w_i$) and aggregated using a weighted average formula (e.g., Eq (2) below) to generate the calibrated modeling result (denoted as $X_c$).

$$X_c = \Sigma^M_{i=1} w_i * X_i / \Sigma^M_{i=1} w_i \qquad \text{Eq (2)}$$

wherein M denotes the number of model realizations that are aggregated.

In one or more embodiments, a statistical distribution of the modeling results is generated as the calibrated modeling result. For example, the statistical distribution may be a percentile distribution of a pore pressure value as a function of depth. An example of the calibrated modeling result including the percentile distribution is described in reference to FIGS. 3.5 and 3.6 below.

In Block 208, a current portion of the field operation is performed based on the calibrated modeling result. In one or more embodiments, a control signal is first generated based on the calibrated modeling result. Accordingly, the current portion of the field operation is then performed based on the control signal.

In Block 209, a determination is made as to whether the field operation has been completed. If the determination is negative, i.e., the field operation has not been completed, the method returns to Block 202 to perform the subsequent calibration iteration for the subsequent portion of the field operation. If the determination is positive, i.e., the field operation has been completed, the method ends.

FIGS. 3.1, 3.2, 3.3, 3.4, 3.5, and 3.6 show an example in accordance with one or more embodiments. In one or more embodiments, the example shown in these figures may be practiced using the E&P computer system shown in FIGS. 1.1 and 1.2 and the method described in reference to FIG. 2 above. The following example is for example purposes and not intended to limit the scope of the claims.

As noted above, basin modeling and/or petroleum systems modeling consider the evolution of a sedimentary basin on geological time scales that are reflected in the field measurements obtained at varying depths in the subterranean formation of a basin. FIG. 3.1 shows a workflow for performing real-time automatic calibration of a stochastic ensemble of model realizations "c" used in the basin modeling and/or petroleum systems modeling. In particular, the real-time automatic calibration is performed during a field operation, such as a drilling operation at a rig "a" of the subterranean formation (312). The real-time automatic calibration is performed by incorporating well measurements "b" from the drilling operation directly into the model realizations "c". The well measurements "b" may include well pressures, temperature logs, porosities, vitrinite reflectances, layer thicknesses, thermal conductivities, geochemical data, permeabilities, etc. obtained using logging-while-drilling (LWD), measuring-while-drilling (MWD), or other standard logging techniques.

In the example, the model realizations are stored in a shared pool of configurable computing resources that is referred to as the cloud (311). As is used herein, the cloud (311) is an Internet-based computing platform that provides shared processing resources and data to user computers and other devices on demand. The cloud (311) may be rapidly provisioned and released with minimal management effort. Input data and output data (e.g. at well trajectories) related to the field operation are stored to avoid exploding of data storage space. Cloud computing and storage solutions provide sharing of resources to achieve coherence and economy of scale, similar to the utility distributed over a network, such as the electricity grid.

As new real-time well measurements "b" are uploaded (e.g., via a satellite link (314)) into the cloud (311) concurrently with the drilling operation at the rig "a", the ensemble of model realizations "c" is adjusted accordingly and used to calculate improved model predictions. In addition, uncertainties of the model predictions may be quantified from the variety of model realizations. Because the updated likelihood function may be re-evaluated, a direct assessment of already simulated model realizations "c" is performed on-the-fly to provide real-time feedback back to the rig "a". Accordingly, the ensemble of model realizations "c" is constantly updated when new data "b" becomes available during drilling and the generated model predictions are accessible via mobile devices in real time. The up-to-date modeling results "d" (including a quantified uncertainty) are then used instantaneously for decision making, such as adjusting a drill path (313) of the well being drilled or determining locations of new wells to be drilled. The instantaneous decision making based on real-time well measurements and up-to-date modeling results reduces drilling time as well as drilling failures.

The basin modeling and/or petroleum systems modeling workflow may include the following: building of the input model, simulation of the model, and viewing the simulation output. First, the simulation from a workstation or an on-premises computer cluster is moved into a cloud computing environment. Cloud computing utilizes massive parallel computing facilities at low cost, hence enabling the user to compare the real-time well measurements to modeling results of millions of different model realizations. As the single realization simulations run independently and have to communicate during calibration and model adding steps, the simulations may be distributed among a large number of processor nodes in the cloud and run in parallel. Thus, the automatic calibration workflow may be suitable for parallel computing on cloud processors. Using the cloud computing based workflow, calibrated modeling results such as a pressure or mud-weight depth plots are generated iteratively during the drilling operation for user viewing by mobile devices, such as smartphones and tablets.

FIG. 3.2 show example model realizations (235), such as an example of the model realization described above with reference to FIG. 1.2. In particular, the model realizations (235) are represented as a two dimensional (2D) region (235-5) that corresponds to an input parameter space for modeling the field (100). Each position within the 2D region (235-5) corresponds to a particular set of values of the input parameters. In other words, each position within the 2D region (235-5) corresponds to a particular input value set.

Each model realization (e.g., model realization A (235-1), model realization B (235-2), etc.) in the initial portion of the model realizations (235) is represented as a square icon within the 2D region (235-5). The position of each square icon corresponds to the input value set that is used to generate the model realization in the initial portion. In addition, each square icon is annotated with "++", "+", or "−" to indicate the likelihood value of the corresponding model realization. For example, "++" indicates that the likelihood value is in a high range, "+" indicates that the likelihood value is in an intermediate range, and "−" indicates that the likelihood value is in a low range.

Each adjusted model realization (e.g., adjusted model realization A (235-3), adjusted model realization B (235-4), etc.) in the model realizations (235) is represented as a round icon within the 2D region (235-5). For example, the adjusted model realization A (235-3) may be generated from the model realization A (235-1) based on a random adjustment described in reference to FIG. 3.3 below. In particular, the model realization A (235-1) is selected based on the high likelihood value indicated by the annotation "++". In another example, the adjusted model realization B (235-4) may be generated by combining the model realization A (235-1) and model realization B (235-2) using a genetic algorithm described in reference to FIG. 3.4 below. In particular, the model realization A (235-1) and model realization B (235-2) are selected based on the high likelihood values indicated by the annotation "++" and "+", respectively.

By applying the random adjustment and the genetic algorithm to model realizations with relatively high likelihood values (e.g., model realization A (235-1), model realization B (235-2)), high likelihood value areas (e.g., area A (235-6) bounded by the two dash lines) of the input parameter space (i.e., the 2D region (235-5)) are explored for expanding the model realizations (235) and avoiding the local maxima or minima of the likelihood values (e.g., within the area B (235-7) and area C (235-8)).

FIG. 3.3 shows a schematic diagram of generating adjusted model realizations by applying the random adjustment. In particular, the model realization A (235-1) in the initial portion (235-5) of the model realizations (235) and the model realization B (235-2) in an expanded portion of the model realizations (235) are selected based on the high likelihood values. By applying random adjustments to the input values of the model realization A (235-1), five adjusted model realizations are generated in a first generation including the adjusted model realization A (235-3). By applying random adjustments to the input values of the adjusted model realization A (235-3), five further adjusted model realizations are generated in a second generation including the adjusted model realization B (235-4). In an example scenario, the first generation is generated in an earlier calibration iteration and the second generation is generated in a subsequent calibration iteration. Accordingly, the five adjusted model realizations are added to expand the model realizations (235) in the earlier calibration iteration. Subsequently, the five further adjusted model realizations are added to further expand the model realizations (235) in the subsequent calibration iteration. In particular, the remaining four adjusted model realizations, except the adjusted model realization A (235-1), are not selected to generate any more adjusted model realization in the second generation. In this context, the model realizations (235) is said to be expanded based on survival of the fittest.

In another example scenario, the first generation and second generation are both generated in the same calibration iteration. Accordingly, the model realization A (235-1) selected from the first generation and the adjusted model realization B (235-4) selected from the second generation are added to expand the model realizations (235) for use in a subsequent calibration iteration. In particular, the remaining four adjusted model realizations and the remaining four further adjusted model realizations are not selected to generate any more adjusted model realization to expand the model realizations (235). In this context, the model realizations (235) are said to be expanded based on survival of the fittest.

FIG. 3.4 shows a schematic diagram of generating adjusted model realizations by applying the genetic algorithm. In particular, five model realization pair combinations are selected out of 32 possible model realization pair combinations in the initial portion (235-5) of the model realizations (235) based on the high likelihood values. By intermixing the input values of each selected model realization pair combination, five adjusted model realizations are generated including the adjusted model realization A (235-3) and the adjusted model realization B (235-4). Accordingly, the five adjusted model realizations are added to expand the model realizations (235) for use in a subsequent calibration iteration.

FIG. 3.5 shows an example calibrated modeling result that is an equivalent mud weight plot generated when a drilling operation reaches a drilling depth of 2000 m (meters). In particular, the example equivalent mud weight plot includes a plot A (320-1) of equivalent mud weight for pore pressure and a plot B (320-2) of equivalent mud weight for fracture pressure. To guide the drilling operation, the plot A (320-1) of equivalent mud weight for pore pressure serves as a lower bound to the mud weight used for drilling while the plot B (320-2) of equivalent mud weight for fracture pressure serves as an upper bound to the mud weight used for drilling. According to the legend (320), each "x" in the plot A (320-1) denotes a pore pressure value or a fracture pressure value based on a well measurement obtained at a corresponding depth during the drilling from the surface to the depth of 2000 m. The well measurement is used for an automatic calibration iteration performed when the drilling reaches the corresponding depth. Specifically, the well measurement "A" and well measurement "B" are new measurements obtained at the depth of 2000 m and corresponding to the pore pressure and fracture pressure, respectively. In particular, the well measurement "A" and well measurement "B" are the aforementioned current measurements used in the automatic calibration iteration to generate the selected model realization(s) and to add the adjusted model realization(s) to the ensemble. Based on the updated ensemble with the newly added adjusted model realization(s), the pore pressure predictions and fracture pressure predictions below the depth 2000 m are generated as the calibrated modeling results. These pressure predictions are used to set up improved mud-weight limits for preventing blow-outs and well destruction by fracturing and for improving the safety and the drilling speed.

As shown in FIG. 3.5, the pore pressure predictions below the depth 2000 m include P10, P50, and P90 of the plot A (320-1) that denote 10 percentile, 50 percentile, and 90 percentile, respectively, of the simulated pore pressure values of the millions of different model realizations. In other words, the simulated pore pressure values from 10% of the millions of different model realizations are below P10, the simulated pore pressure values from 50% of the millions of different model realizations are below P50, and the simulated pore pressure values from 90% of the millions of different model realizations are below P90. Similarly, the fracture pressure predictions below the depth 2000 m include P10, P50, and P90 of the plot B (320-2) that denote 10 percentile, 50 percentile, and 90 percentile, respectively, of the simulated fracture pressure values of the millions of different model realizations. In other words, the simulated fracture pressure values from 10% of the millions of different model realizations are below P10, the simulated fracture pressure values from 50% of the millions of different model realizations are below P50, and the simulated fracture pressure values from 90% of the millions of different model realizations are below P90.

FIG. 3.6 shows an example calibrated modeling result that is an equivalent mud weight plot generated when the drilling operation reaches a drilling depth of 3600 m. In particular, the example equivalent mud weight plot includes a plot C (330-1) of equivalent mud weight for pore pressure and a plot D (330-2) of equivalent mud weight for fracture pressure. Similar to the example equivalent mud weight plot depicted in FIG. 3.5 above, the plot C (330-1) of equivalent mud weight for pore pressure serves as a lower bound to the mud weight used for drilling while the plot D (330-2) of equivalent mud weight for fracture pressure serves as an upper bound to the mud weight used for drilling. According to the legend (330), each "x" in the plot A (320-1) denotes a pore pressure value or a fracture pressure value based on a well measurement obtained at a corresponding depth during the drilling from the surface to the depth of 3600 m. The well measurement is used for an automatic calibration iteration performed when the drilling reaches the corresponding depth. Specifically, the well measurement "C" and well measurement "D" are new measurements obtained at the depth of 3600 m and corresponding to the pore pressure and fracture pressure, respectively. In particular, the well measurement "C" and well measurement "D" are the aforementioned current measurements used in the automatic calibration iteration to generate the selected model realization(s) and to add the adjusted model realization(s) to the ensemble. Based on the updated ensemble with the newly added adjusted model realization(s), the pore pressure predictions and fracture pressure predictions below the depth 3600 m are generated as the calibrated modeling results. These pressure predictions are used to set up improved mud-weight limits for preventing blow-outs and well destruction by fracturing and for improving the safety and the drilling speed.

As shown in FIG. 3.6, the pore pressure predictions below the depth 3600 m include P10, P50, and P90 of the plot C (330-1) that denote 10 percentile, 50 percentile, and 90 percentile, respectively, of the simulated pore pressure values of the millions of different model realizations. Similarly, the fracture pressure predictions below the depth 3600 m include P10, P50, and P90 of the plot D (330-2) that denote 10 percentile, 50 percentile, and 90 percentile, respectively, of the simulated fracture pressure values of the millions of different model realizations.

During the drilling operation described in FIGS. 3.5 and 3.6 above, the modeling input data and a portion of the modeling output data (e.g., modeling results at well trajectories) are included in the model realizations to reduce the data storage space. Re-simulation of any model realization is performed to add additional data (e.g., related to a new well location) to reduce computing resources.

Embodiments of automatic calibration for modeling a field may be implemented on a computing system. Any combination of mobile, desktop, server, router, switch, embedded device, or other types of hardware may be used. For example, as shown in FIG. 4.1, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

The computing system (400) in FIG. 4.1 may be connected to or be a part of a network. For example, as shown in FIG. 4.2, the network (420) may include multiple nodes (e.g., node X (422), node Y (424)). Each node may correspond to a computing system, such as the computing system shown in FIG. 4.1, or a group of nodes combined may correspond to the computing system shown in FIG. 4.1. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (400) may be located at a remote location and connected to the other elements over a network.

Although not shown in FIG. 4.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4.1. Further, the client device (426) may include and/or perform at least a portion of one or more embodiments.

The computing system or group of computing systems described in FIGS. 4.1 and 4.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the claims. The processes may be part of the same or different application and may execute on the same or different computing system.

Rather than or in addition to sharing data between processes, the computing system performing one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments, may extract one or more data items from the obtained data. For example, the extraction may be performed as follows by the computing system in FIG. 4.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (including layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 4.1, while performing one or more embodiments, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 4.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 4.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 4.1 and the nodes and/or client device in FIG. 4.2. Other functions may be performed using one or more embodiments.

While one or more embodiments have been described with respect to a limited number of embodiments, those skilled in the art, having benefit of this disclosure, will appreciate that other embodiments may be devised which do not depart from the scope as disclosed herein. Accordingly, the scope should be limited by the attached claims.

What is claimed is:

1. A method for performing a field operation of a field, comprising:

performing a plurality of model calibration iterations based on a plurality of measurements of the field, wherein each of the plurality of model calibration iterations comprises:

obtaining, during the field operation, a current measurement of the field;

generating a plurality of likelihood values corresponding to a plurality of model realizations of the field, wherein each of the plurality of likelihood values is generated by at least comparing the current measurement of the field to a modeling result of a corresponding model realization;

selecting, based on the plurality of likelihood values, at least one selected model realization from the plurality of model realizations;

generating, by at least adjusting a first input value of the at least one selected model realization, an adjusted model realization of the field based on the at least one selected model realization, wherein adjusting the first input value comprises aggregating the first input value with a second input value of at least one of the plurality of model realizations, or wherein adjusting the first input value comprises a random adjustment; and adding the adjusted model realization to the plurality of model realizations; and generating a calibrated modeling result of the field based on the adjusted model realization from at least one of the plurality of model calibration iterations.

2. The method of claim 1, wherein obtaining the current measurement during each of the plurality of model calibration iterations comprises:

obtaining, during a first portion of the field operation, a first measurement from a first field location accessed by the first portion of the field operation, wherein the first measurement is the current measurement used in a first model calibration iteration performed during the first portion of the field operation; and obtaining, during a second portion of the field operation, a second measurement from a second field location accessed by the second portion of the field operation, wherein the second measurement is the current measurement used in a second model calibration iteration performed during the second portion of the field operation, and wherein the second portion of the field operation is performed subsequent to the first portion of the field operation and based on the adjusted model realization generated in the first model calibration iteration.

3. The method of claim 1,
wherein adjusting the first input value comprises a random adjustment.

4. The method of claim 1,
wherein adjusting the first input value comprises aggregating the first input value with a second input value of at least one of the plurality of model realizations.

5. The method of claim 1, further comprising:
identifying a plurality of input value sets, wherein each of the plurality of input value sets comprises a plurality of input values corresponding to a plurality of input parameters for modeling the field; and generating, prior to the plurality of model calibration iterations, an initial set of model realizations, wherein each model realization in the initial set of model realizations is based on one of the plurality of input value sets, wherein the plurality of model realizations in each of the plurality of model calibration iterations is based at least on the initial set of model realizations.

6. The method of claim 5, wherein generating each of the plurality of likelihood values comprises:

obtaining a plurality of probability density functions corresponding to the plurality of input parameters, wherein each of the plurality of probability density functions represents a level of uncertainty of a corresponding input parameter; and generating a statistical value of error in response to comparing the measurement of the field to the modeling result of the corresponding model realization, wherein each of the plurality of likelihood values is generated based on the plurality of probability density functions and the statistical value of error.

7. The method of claim 6, wherein at least one of the plurality of model calibration iterations further comprises:

adjusting, based on the plurality of likelihood values, the plurality of probability density functions to be used in a subsequent model calibration iteration.

8. The method of claim 1, wherein selecting the at least one selected model realization comprises:

performing statistical sampling from the plurality of likelihood values using at least one consisting of a genetic algorithm, a Markov Chain Monte Carlo algorithm, a Metropolis Sampling algorithm, and a Kalman Filtering algorithm.

9. A system for performing a field operation of a field, comprising:

an exploration and production (E&P) computer system, comprising:

a computer processor; and memory storing instructions executed by the computer processor, wherein the instructions comprise functionality to:

perform a plurality of model calibration iterations based on a plurality of measurements of the field, wherein each of the plurality of model calibration iterations comprises:

obtaining, during the field operation, a current measurement of the field;

generating a plurality of likelihood values corresponding to a plurality of model realizations of the field, wherein each of the plurality of likelihood values is generated by at least comparing the current measurement of the field to a modeling result of a corresponding model realization;

selecting, based on the plurality of likelihood values, at least one selected model realization from the plurality of model realizations;

generating, by at least adjusting a first input value of the at least one selected model realization, an adjusted model realization of the field based on the at least one selected model realization, wherein adjusting the first input value comprises aggregating the first input value with a second input value of at least one of the plurality of model realizations, or wherein adjusting the first input value comprises a random adjustment; and adding the adjusted model realization to the plurality of model realizations; and generate a calibrated modeling result of the field based on the adjusted model realization from at least one of the plurality of model calibration iterations; and a repository for storing the plurality of model realizations, the plurality of likelihood values, and the calibrated modeling result.

10. The system of claim 9, wherein obtaining the current measurement during each of the plurality of model calibration iterations comprises:

obtaining, during a first portion of the field operation, a first measurement from a first field location accessed by the first portion of the field operation, wherein the first measurement is the current measurement used in a first model calibration iteration performed during the first portion of the field operation; and obtaining, during a second portion of the field operation, a second measurement from a second field location accessed by the second portion of the field operation, wherein the second measurement is the current measurement used in a second model calibration iteration performed during the second portion of the field operation, and wherein the second portion of the field operation is performed subsequent to the first portion of the field operation and based on the adjusted model realization generated in the first model calibration iteration.

11. The system of claim 9, wherein the instructions further comprise functionality to:
- identify a plurality of input value sets, wherein each of the plurality of input value sets comprises a plurality of input values corresponding to a plurality of input parameters for modeling the field; and
- generate, prior to the plurality of model calibration iterations, an initial set of model realizations, wherein each model realization in the initial set of model realizations is based on one of the plurality of input value sets,
- wherein the plurality of model realizations in each of the plurality of model calibration iterations is based at least on the initial set of model realizations.

12. The system of claim 11, wherein generating each of the plurality of likelihood values comprises:
- obtaining a plurality of probability density functions corresponding to the plurality of input parameters, wherein each of the plurality of probability density functions represents a level of uncertainty of a corresponding input parameter; and
- generating a statistical value of error in response to comparing the measurement of the field to the modeling result of the corresponding model realization,
- wherein each of the plurality of likelihood values is generated based on the plurality of probability density functions and the statistical value of error.

13. The system of claim 12, wherein at least one of the plurality of model calibration iterations further comprises:
- adjusting, based on the plurality of likelihood values, the plurality of probability density functions to be used in a subsequent model calibration iteration.

14. The system of claim 9, wherein selecting the at least one selected model realization comprises:
- performing statistical sampling from the plurality of likelihood values using at least one consisting of a genetic algorithm, a Markov Chain Monte Carlo algorithm, a Metropolis Sampling algorithm, and a Kalman Filtering algorithm.

15. A non-transitory computer readable medium storing instructions that are configured to, when executed, cause a computer processor to:
- perform a plurality of model calibration iterations based on a plurality of measurements of a field, wherein each of the plurality of model calibration iterations comprises:
  - obtaining, during a field operation, a current measurement of the field;
  - generating a plurality of likelihood values corresponding to a plurality of model realizations of the field, wherein each of the plurality of likelihood values is generated by at least comparing the current measurement of the field to a modeling result of a corresponding model realization;
  - selecting, based on the plurality of likelihood values, at least one selected model realization from the plurality of model realizations;
  - generating, by at least adjusting a first input value of the at least one selected model realization, an adjusted model realization of the field based on the at least one selected model realization, wherein adjusting the first input value comprises aggregating the first input value with a second input value of at least one of the plurality of model realizations, or wherein adjusting the first input value comprises a random adjustment; and
  - adding the adjusted model realization to the plurality of model realizations; and
- generate a calibrated modeling result of the field based on the adjusted model realization from at least one of the plurality of model calibration iterations.

16. The computer readable medium of claim 15, wherein the instructions are further configured to, when executed, cause the computer processor to:
- identify a plurality of input value sets, wherein each of the plurality of input value sets comprises a plurality of input values corresponding to a plurality of input parameters for modeling the field; and
- generate, prior to the plurality of model calibration iterations, an initial set of model realizations, wherein each model realization in the initial set of model realizations is based on one of the plurality of input value sets,
- wherein the plurality of model realizations in each of the plurality of model calibration iterations is based at least on the initial set of model realizations.

17. The computer readable medium of claim 16, wherein the instructions are configured to, when executed, cause the computer processor to generate each of the plurality of likelihood values by, when executed, causing the computer processor to:
- generate each of the plurality of likelihood values comprises:
- obtain a plurality of probability density functions corresponding to the plurality of input parameters, wherein each of the plurality of probability density functions represents a level of uncertainty of a corresponding input parameter; and
- generate a statistical value of error in response to comparing the measurement of the field to the modeling result of the corresponding model realization,
- wherein each of the plurality of likelihood values is generated based on the plurality of probability density functions and the statistical value of error.

18. The computer readable medium of claim 17, wherein at least one of the plurality of model calibration iterations further comprises:
- adjusting, based on the plurality of likelihood values, the plurality of probability density functions to be used in a subsequent model calibration iteration.

19. The computer readable medium of claim 15, wherein selecting the at least one selected model realization comprises:
- performing statistical sampling from the plurality of likelihood values using at least one consisting of a genetic algorithm, a Markov Chain Monte Carlo algorithm, a Metropolis Sampling algorithm, and a Kalman Filtering algorithm.

20. The computer readable medium of claim 15, wherein the obtaining the current measurement during each of the plurality of model calibration iterations comprises:
- obtaining, during a first portion of the field operation, a first measurement from a first field location accessed by the first portion of the field operation, wherein the first measurement is the current measurement used in a first model calibration iteration performed during the first portion of the field operation; and
- obtaining, during a second portion of the field operation, a second measurement from a second field location accessed by the second portion of the field operation, wherein the second measurement is the current measurement used in a second model calibration iteration performed during the second portion of the field operation, and
- wherein the second portion of the field operation is performed subsequent to the first portion of the field operation and based on the adjusted model realization generated in the first model calibration iteration.

* * * * *